United States Patent [19]

Hagenbuch

[11] Patent Number: 4,614,477
[45] Date of Patent: Sep. 30, 1986

[54] APPARATUS AND METHOD FOR MONITORING AND CONTROLLING THE VOLUMETRIC LOADING OF A TRUCK BODY

[76] Inventor: Leroy G. Hagenbuch, 4602 N. Rosemead, Peoria, Ill. 61614

[21] Appl. No.: 508,177

[22] Filed: Jun. 27, 1983

[51] Int. Cl.$^4$ .......................................... B65G 67/04
[52] U.S. Cl. ...................................... 414/786; 73/296; 73/323; 116/227; 220/82 R; 222/156; 296/183; 296/184; 340/617
[58] Field of Search ...................... 340/603, 612, 617; 414/328, 786, 289, 296, 373; 296/183, 184; 220/82 R, 82 A; 73/290 R, 323, 296; 222/156; 116/28 R, 56, 227, 276; 177/136; 105/247, 248

[56] References Cited

U.S. PATENT DOCUMENTS

| | | | |
|---|---|---|---|
| 417,117 | 12/1889 | Thompson et al. | 200/61.21 |
| 848,519 | 3/1907 | Versteeg | 200/61.21 |
| 1,220,422 | 3/1917 | Hewitt | 222/574 |
| 1,514,531 | 11/1924 | Kendall | 222/135 |
| 2,482,027 | 9/1949 | Poole | 177/136 |
| 2,568,332 | 9/1951 | Genovese | 200/61.21 |
| 2,627,244 | 2/1953 | Herigstad | 340/617 X |
| 2,745,920 | 5/1956 | Keephart | 340/617 X |
| 2,916,916 | 12/1959 | Holsclaw | 73/427 |
| 3,017,987 | 1/1962 | Moslo | 206/45.31 |
| 3,148,912 | 9/1964 | Curtis et al. | 296/50 |
| 3,357,576 | 12/1967 | Strombeck et al. | 414/373 X |
| 3,531,766 | 9/1970 | Henzel | 177/136 X |
| 3,550,447 | 12/1970 | Beresic | 340/617 X |
| 3,666,119 | 5/1972 | Parsons | 340/617 X |
| 3,685,356 | 8/1972 | Zimmerman | 200/61.21 X |
| 3,865,439 | 2/1975 | Moser et al. | 414/296 X |
| 3,964,620 | 6/1976 | Parsons | 414/328 X |
| 3,991,913 | 11/1976 | Steffen | 222/156 |
| 4,031,342 | 6/1977 | Peterson | 200/61.21 |
| 4,108,262 | 8/1978 | Anderson | 177/136 |
| 4,333,589 | 10/1982 | Hartbert | 296/50 |

FOREIGN PATENT DOCUMENTS

| | | | |
|---|---|---|---|
| 480406 | 8/1929 | Fed. Rep. of Germany | 340/617 |
| 2210247 | 9/1973 | Fed. Rep. of Germany | 220/82 A |

Primary Examiner—James L. Rowland
Assistant Examiner—Daniel Myer
Attorney, Agent, or Firm—Leydig, Voit & Mayer, Ltd.

[57] ABSTRACT

The invention provides an apparatus and method for monitoring the volume of material loaded into a truck body. Apparatus is provided for sensing the volume of material held in the truck body and indicating, visually or audibly, when a predetermined volumetric loading has been accomplished. Such an indication informs the appropriate personnel that, if the material being loaded is of high density, loading should be stopped. Several different embodiments for the sensing apparatus are disclosed, one of which is a plurality of horizontal holes in the side of the truck body located at a level corresponding to the maximum loading level for a high density material. A cover plate is provided for covering these holes when not being used as a horizontal sight gauge for monitoring the volume level of the material being loaded. Each of the plurality of holes includes a mechanism for preventing material flow through the holes when the cover plate is lowered to expose them to view for use as a horizontal sight gauge.

7 Claims, 12 Drawing Figures

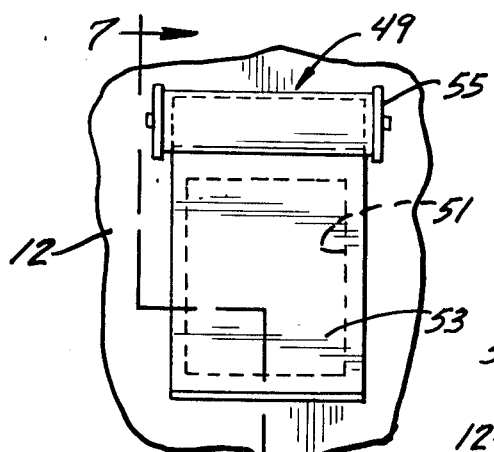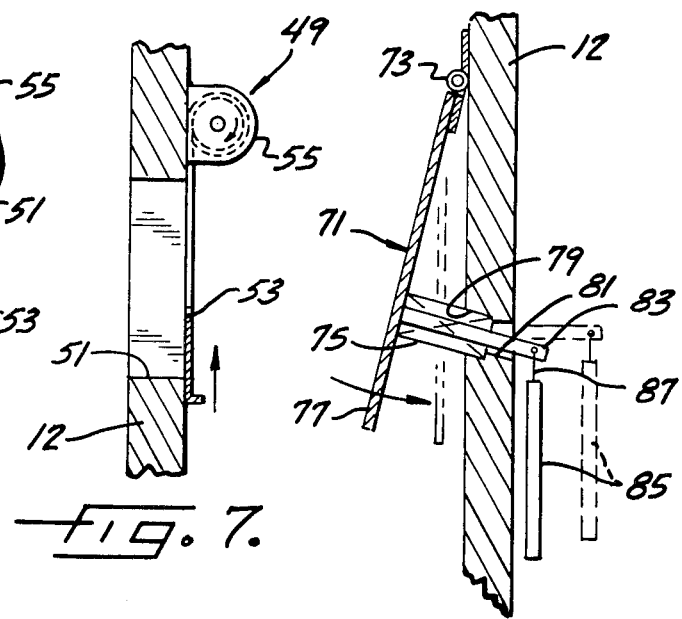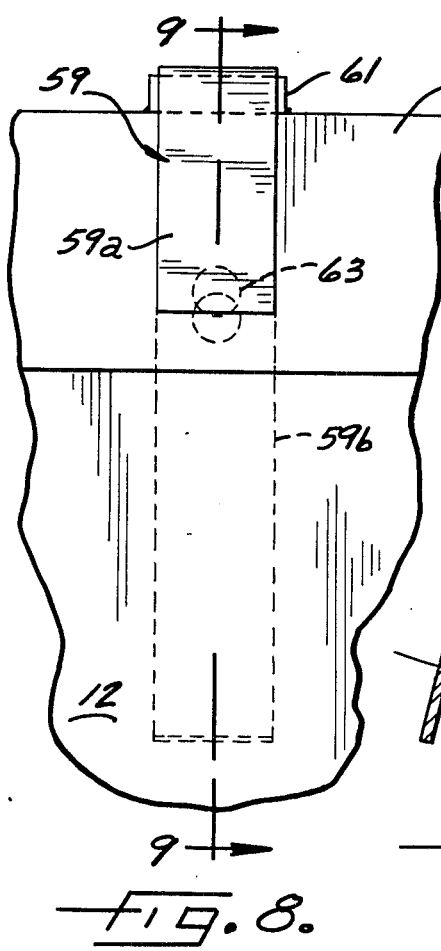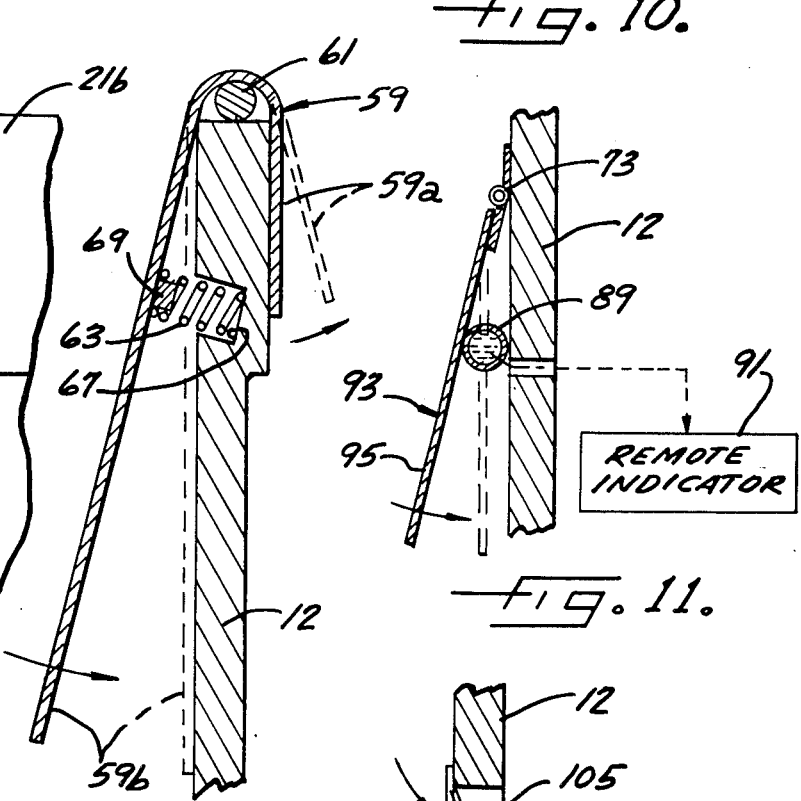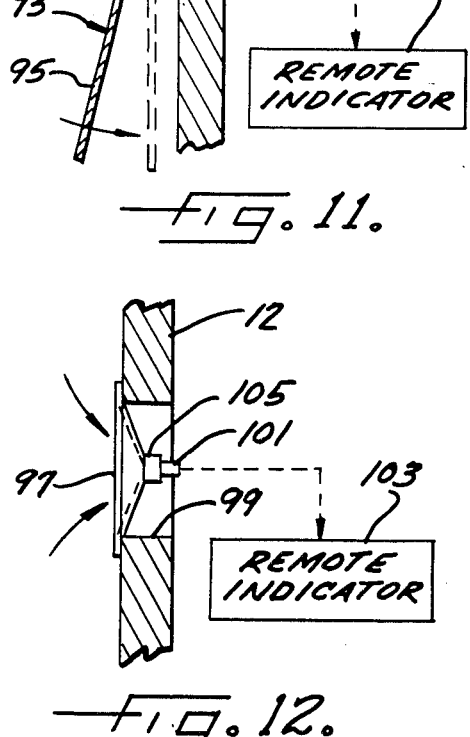

APPARATUS AND METHOD FOR MONITORING AND CONTROLLING THE VOLUMETRIC LOADING OF A TRUCK BODY

FIELD OF THE INVENTION

The invention relates to control of a truck's capacity and, more particularly, to the monitoring of the loading of a truck body for preventing weight overloading of the truck.

BACKGROUND OF THE INVENTION

Often, off-road trucks are subjected, during their routine use, to weight loads which differ greatly because of different material density and/or the ability of some material to more tightly pack when loaded into the truck body. As a result, truck bodies which are always filled to their full volume capacity may carry weight loads which exceed the capacity of the truck. Repeated occurrences of overloading result in the premature deterioration of the structural integrity of the truck, thus requiring repair or replacement of parts before anticipated.

Off-road trucks have truck bodies which are opaque and mounted on the truck at a level which makes visual inspection on the interior of the truck impossible without actually climbing to a level higher than the truck body sides. Accordingly, it is difficult to determine when the weight capacity of the truck has been reached even when it is known that the material being loaded will exceed the weight capacity if loaded to the truck body's full volume. Ordinarily, the trucks are loaded to their full volume capacity since it is only after full volume capacity is reached that there is any visual indication as to the degree of volume loading in the truck (i.e., material can be observed above the side wall of the truck bed).

Because of the inconvenience of clumsy and sometimes dangerous climbs on the side of a truck in order to peer inside the truck body, there is little assurance that the users of such off-road trucks will monitor the weight capacity of the truck, as opposed to the volume capacity of the truck. Moreover, in an era when getting the job done quickly and efficiently is stressed, there is little incentive to take the additional time required to ensure the truck is not weight overloaded.

Finally, climbing to a level high enough to visually inspect the volume of the contents in the truck body, involves some degree of risk and also tends to slow down operations. Requiring the stationing of an observer to monitor the level of loading raises the possibility of the observer falling from his or her perch or being injured by moving equipment as the truck body is filled.

The users of off-road trucks are left with the choice of either taking considerable risk and expense by stationing someone in a position high enough to look into the truck body, or ignoring the truck's weight capacity and loading the truck body to full volume on every load; or, as a third alternative, operating the truck inefficiently by estimating the weight loading of the truck and stopping the loading of the truck body when the weight capacity is guessed to be achieved.

SUMMARY OF THE INVENTION

It is an object of the invention to provide an apparatus and method for monitoring the volumetric loading of a truck body to control the total weight loaded when the relative material density is known.

It is a further object of the invention to provide an apparatus and method which quickly checks the weight loading of a truck body without interfering or interrupting with the continued loading of the truck.

It is still another object of the invention to extend the usable life of a truck by preventing unnecessary deterioration of the structural integrity of the truck resulting from weight overloading.

Other objects and advantages of the invention will be apparent from the following detailed description and the accompanying drawings.

In summary, the invention provides an apparatus and method for monitoring the volume of material loaded into a truck body. Apparatus is provided for sensing the volume of material held in the truck body and indicating, visually or audibly, when a predetermined volumetric loading has been accomplished. Such an indication informs the appropriate personnel that, if the material being loaded is of high density, loading should be stopped. Several different embodiments for the sensing apparatus are disclosed, one of which is a plurality of horizontal holes in the side of the truck body located at a level corresponding to the maximum loading level for a high density material. A cover plate is provided for covering these holes when they are not being used as a horizontal sight gauge for monitoring the volume level of the material being loaded. Each of the plurality of holes includes a mechanism for preventing material flow through the holes when the cover plate is lowered to expose them to view for use as a horizontal sight gauge.

BRIEF DESCRIPTION OF THE DRAWINGS

FIG. 6 is a plan view of a second alternate embodiment of a horizontal sight gauge according to the invention;

FIG. 7 is a cross-sectional view of a horizontal sight gauge in FIG. 6 taken along the line 7—7;

FIG. 8 is a plan view of a third alternate embodiment of a horizontal sight gauge according to the invention;

FIG. 9 is a cross-sectional view of a horizontal sight gauge in FIG. 8 taken along the line 9—9;

FIG. 10 is a cross-sectional view of a fourth alternate embodiment of a horizontal sight gauge according to the invention;

FIG. 11 is a cross-sectional view of a fifth alternate embodiment of a horizontal gauge according to the invention; and FIG. 12 is a cross-sectional view of a sixth alternate embodiment of a horizontal gauge according to the invention.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

DESCRIPTION OF THE PREFERRED EMBODIMENTS

Figure 1:
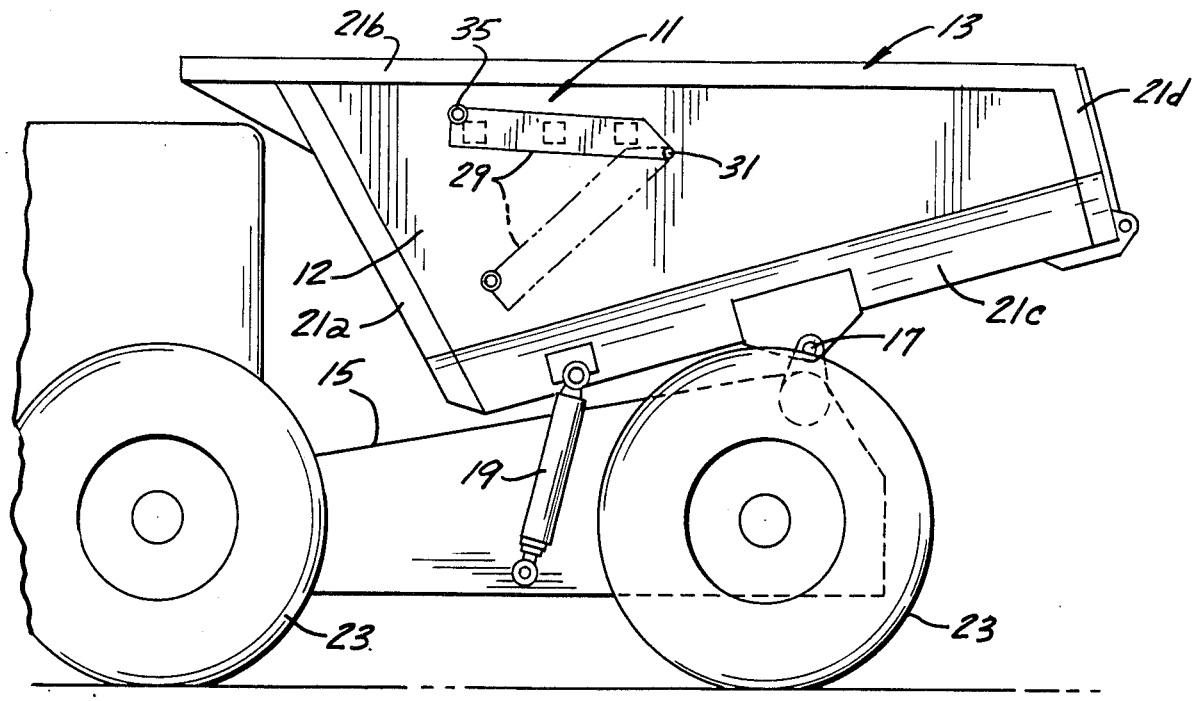
FIG. 1 is a side view of a truck frame and truck body incorporating a horizontal sight gauge according to the invention.

Turning to the drawings, and referring first to FIG. 1, a truck is illustrated with a horizontal sight guage 11 mounted on the side wall 12 of the truck body 13. The truck body 13 is mounted on an off-road truck frame 15 for pivoting about an axis 17. A hydraulic piston 19 operates the truck body 13 about the axis 17 between a raised and lowered position. Structurally, the truck body 13 consists of steel panels which form the shape of the body and beams 21a–d which provide the structural frame work for the truck body.

Often trucks, such as the one shown in FIG. 1, are tremendously large off-road trucks. Their tires 23 may have a diameter as large as the height of a man. Accordingly, because of the high elevation of the truck body it is difficult to observe the inside of the truck body as it is being loaded.

The immense physical structure of off-road trucks, and the heavy loads they carry, requires that work in and around these trucks be carried out with special caution. Since these trucks represent a large capital investment, preventing weight overload of the trucks is important in ensuring the truck's usable life is extended as long as possible. Typically, a front-end loader is used to fill the truck body. Even though the operator of the front-end loader is at an elevated level when operating the loader, he or she is not in a position to see over the edge of the truck body to determine the level of loading. Consequently, exact control of the level of loading in the truck body is difficult.

Figure 2:
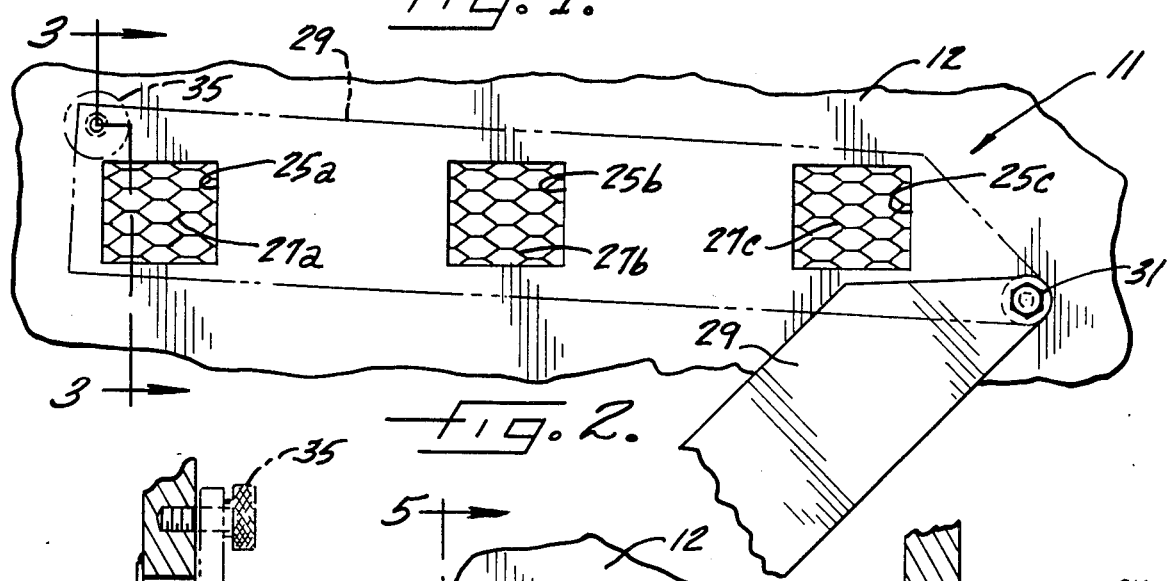
FIG. 2 is an enlarged plan view of the horizontal sight gauge in FIG. 1.

In accordance with one important aspect of the invention, FIG. 2 shows a horizontal sight gauge 11 comprising a series of holes 25a–c in the side of the truck body for monitoring the volumetric loading of the truck body. The horizontal holes give the operator of a front-end loader the ability to gauge the volumetric loading of the truck body while seated at his machine. Thus, when a material of high density is being loaded into the truck body, overloading can be avoided without requiring the operator of the front-end loader to guess the level of volumetric loading in the truck body.

The holes 25a–c in the side of the truck body may be covered by a screen mesh 27a–c in order to inhibit the flow of material out through the holes. When the holes are not being used as a horizontal sight gauge to measure the volumetric loading of the truck body, a cover plate 29, which pivots about a point on the side of the truck body, is swung into a position covering the horizontal holes 25a–c.

As FIGS. 1 and 2 show, the cover plate 29 pivots between closed position, shown by solid lines in FIG. 1, and a hole exposing position, shown by solid lines in FIG. 2. As shown in the cross-section of FIG. 3, the pivot 31 can be a threaded screw inserted through a bore in the cover plate 29 and screwed into mating threads in the side wall 12 of the truck body 13. To enable the cover plate 29 to pivot freely about the threaded screw, a pair of washers 33a and 33b are placed over the threaded screw and on opposite sides of the cover plate 29. Alternatively, the pivot 31 for the cover plate 29 can be a pin welded to the side of the truck body with a cotter pin inserted through a hole in the pin for preventing the cover plate 29 from sliding off the pin.

Figures 3, 4, 5:
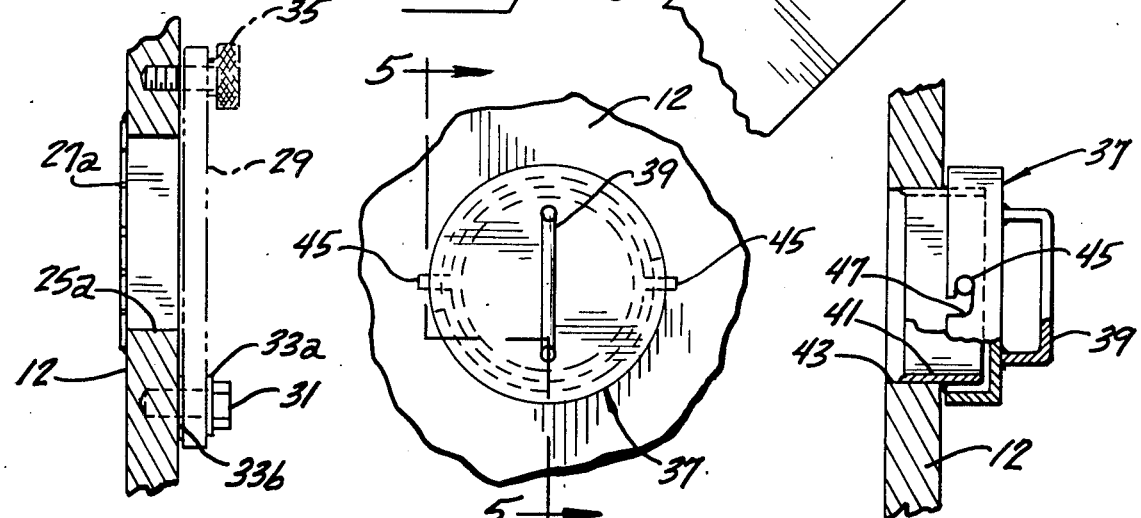
FIG. 3 is a cross-sectional view of the horizontal sight gauge in FIG. 2 taken along the line 3—3.
FIG. 4 is a plan view of a first alternate embodiment of a horizontal sight gauge according to the invention.
FIG. 5 is a cross-sectional view of a horizontal sight gauge in FIG. 4 taken along the line 5—5.

In order to hold the cover plate 29 latched in its closed position, the cover plate 29 may be latched closed by a threaded screw 35 fitted through a bore in the cover plate 29 and mated with a threaded hole in the side wall 12 of the truck body 13 as shown in the cross-section of FIG. 3. The head of the screw 35 may be knurled as illustrated in FIG. 3 to facilitate an easy grip for turning the screw. Alternatively, to hold the cover plate 29 closed, a spring loaded pin may be fitted into a recessed area in the side wall 12 of the truck body 13. The cover plate 29 may be made of steel or any other suitable material, such as lightweight plastic which would ease the effort required in lowering and raising the cover plate.

FIGS. 4–12 show alternate embodiments of the sight gauge. Although only one sensing device is shown in each figure, it will be appreciated that each embodiment preferably consists of a plurality of the sensing devices spaced horizontally across the side wall of the truck body in a manner similar to that shown in FIG. 1. The plurality of sensing devices allows the observer, or the mechanism monitoring the sensing devices, to more accurately determine when the high density volume limit has been reached. If a majority of the sensing devices indicate that material has reached the volume limit for a high density load, the operator of the front-end loader, or the truck driver, can be certain the volume limit has been reached.

The first alternative embodiment, shown in FIGS. 4 and 5 comprises a plug 37 which fits over an annulus 41 projecting outwardly from a circular hole 43 cut through the side wall 12 of the truck body 13. The plug 37 includes a handle 39 which allows the plug to be twisted or pulled free of the truck body side wall 12, depending on the means used for attaching the plug 37 to the side wall 12. A bayonet-type closure is the particular means for attaching the plug 37 shown in the cross-sectional view of FIG. 5, but other closures may work equally well. The annulus 41 is welded to the walls of the circular hole 43 to form the projection which is capped by the plug 37. Welded onto the projecting portion of the annulus 41 are two diametrically opposed pins 45. By coupling the pins 45 into slots 47 in the plug 37, the resulting bayonet closure secures the plug 37 in place over the circular hole 43.

As another alternative embodiment of the horizontal sight gauge, FIGS. 6 and 7 show a roller screen 49 which, much like a window shade, can be pulled down over a square gauge hole 51 or pushed up to expose a view of the interior of the truck body. The cross-sectional view of the roller screen 51, shown in FIG. 7, indicates that the covering 53 can be rolled into a housing 55 for the purpose of exposing the gauge hole 51. The roller screen 49 is located on the outside wall of the truck body side wall.

FIGS. 8 and 9 show still another embodiment of the horizontal sight gauge. FIG. 8 is a side elevation of a portion of the truck body 13 side wall 12 including an inverted J-shaped strip 59 which, is pivoted on the top edge of the beam 21b to function as a flag which indicates when the level of loading has reached a predetermined height in the truck body. As the cross-sectional view in FIG. 9 illustrates, the curved portion of the strip 59 rests on a cylindrical bearing 61 welded to the top edge of the truck body beam 21b. The position of the strip 59 shown in solid lines in FIG. 9 indicates the level of loading in the truck body has not yet reached the volumetric capacity for a high density material. The second, position of the strip 59, shown in broken lines in FIG. 9, indicates the volumetric limit has been reached for high density loading.

The strip 59 is biased by a spring 63 in a position which holds the outside leg 59a of the strip flush against the truck body side wall. As material is loaded into the truck body the material climbs to the level where the inside leg 59b of the strip 59 is located. As a result, the inside leg 59b is pressed by the loaded material toward the side wall 12, thereby compressing spring 63 and moving the outside leg 59a against the side wall 12. Accordingly, the resulting movement of the outside leg 59a away from the side wall 12 of the truck body alerts the loader operator, or other observer, that the high density volumetric level has been reached. In order to hold the spring 63 in place, a circular bore 67 in the beam 21b receives one end of the spring 63 and the second end of the spring fits over a pin 69 welded to the strip 59.

Another similar mechanism which gives a visual indication when the level for high density loading is reached is a variable position bar such as is shown in FIG. 10. A flat strip 71, shown in cross-section in FIG. 10, is welded to a hinge 73 which in turn is welded to the inside of the side wall 12. A coil spring 75 biases the flat strip's free end 77 away from the side wall 12. The spring 75 is mounted into the side wall 12 of the truck body 13 in the same manner as the spring 63 in FIG. 9. In the embodiment of FIG. 10, the circular bore 79 which receives the spring 75 is joined by a second smaller bore 81 which extends through the outer surface of the side wall 12. A bar 83 welded to the flat strip 71 is concentric with the spring 75, running through the interior of spring 75 and the dual bores 79 and 81 in the truck body side wall 12.

A second bar 85 is connected to the free end of the bar 83 which protrudes through to the outside truck body side wall 12. The second bar 85 hangs freely from a chain or wire connection 87 between the two bars. The relative spacing between the truck body side wall 12 and the vertically hanging bar 85 tells the loader operator when the high density volumetric limit has been reached. As material is loaded into the truck body it rises to a level which presses against the flat strip 71 in the region of the free end 77, which compresses spring 75 and moves the end of the bar 83 and the vertically hanging bar 85 away from the surface of the side wall 12, as indicated by the broken-line position of the device in FIG. 10. Vertically hanging bar 85 gives the operator an easily observable visual guide to determine when the flat strip 71 has been compressed.

Usually, as a truck is being loaded, the truck driver waits in the truck cab. FIG. 11 illustrates a hydraulic sensor 89 which might activate an indicator 91 in the truck cab to signal the driver that the truck's high density load limit has been reached. A flat strip 93, similar to the flat strip 71 in FIG. 10, is welded to hinge 73, the same type of hinge as in FIG. 10.

The hydraulic sensor 89 in FIG. 11 is a liquid-filled flexible tube which yields when pressure is applied to the free end 95 of the bar strip 93. As material is loaded in the truck body it reaches the height of the free end 95 of the bar strip 93 and urges the bar strip toward the surface of the side wall 12. In response, the hydraulic sensor 89 distorts in shape and indicates to the remote indicator 91, in a conventional manner, an increased liquid pressure which the indicator 91 interprets as a signal that the material being loaded has reached the height of the free end 95 of the bar strip 93.

As an alternate arrangement to the embodiment of FIG. 11, the hydraulic sensor 89 may be replaced by an electrical switch whose contact is normally open. With such a switch, movement of the bar strip 93 toward the surface of the side wall 12, in response to the loading of material into the truck body, closes the normally open contact.

The closed contact may directly activate a light or buzzer in the truck cab, or it may merely register, with a conventional circuit in the indicator device 91, as one sensor where a majority are needed to activate an indicator light. To implement this the indicator 91 could simply include an analog counter which turns on a light or buzzer on the truck dashboard only when a preset count has been reached. For example, if it is desired that a majority of the sensing devices register the presence of material on the side wall of the truck body, and there are five sensing devices, than the analog counter would be preset to respond to a count of three. The counter may cause the activation of a single light or a single buzzer in response to a majority of the sensors indicating the presence of material. Thus, the possibility of a false indication is reduced, and reliability is improved by requiring a majority for detection as opposed to allowing a single sensing device the ability to indicate a full high density load condition.

FIG. 12 is a cross-sectional view of a pressure sensitive diaphragm 97 mounted in a circular hole 99 in the side wall 12 of the truck body 13. A cylinder 101 for actuating an indicator 103 is mounted at one end to a mounting ring 105 fixed to the center of the diaphram 97 such that the cylinder axis is coincident with the common center of the diaphram and circular hole.

As material is loaded into the truck body 13, a side wall level is reached where the material begins to push against the diaphragm 97. When the diaphragm is pushed outwardly, the connected cylinder 101 moves longitudinally along its axis. The displacement of the cylinder 101 may activate electromechanical or mechanical devices for the purpose of registering detection of the material's presence at the diaphragm level. The remote indicator 103 may be a conventional alert light mounted on the truck dashboard or, alternatively, it may be an audio alarm (e.g., the truck's horn) which alerts the driver that a full weight load of high density material has been reached.

It will be appreciated from the foregoing that the horizontal sight guage according to the invention facilitates prevention of weight overloading in a truck body. Monitoring of the controlled volumetric loading of the truck body can be accomplished without interference or disruption of the loading process. Since the horizontal sight guage is especially of great utility in large off-road trucks, which represent large capital investments, it can also be appreciated that the invention helps prevent unnecessary deterioration of the structural integrity of the truck frame and truck body which occur from weight overloading of the truck.

I claim:

1. A method of preventing the overloading of the weight capacity of an opaque truck body when said truck body is used for hauling several different materials of different density, wherein loading material of a first density to the full volume capacity of an initially empty truck body does not exceed the weight capacity of said truck body; said method comprising the steps of:
a. loading material of a second greater density into an initially empty truck body;
b. sensing the horizontal distribution of the material of a second density at discrete locations along a predetermined level on said truck body side wall which corresponds to less than the full volume capacity of said truck body and which defines a maximum loading level for said material of a second density beyond which level the weight capacity of the truck body would be exceeded; and
c. stopping the loading of the material of a second density into said truck body in response to the sensing of an even horizontal distribution of the material at the predetermined level.

2. A method of preventing the overloading of the weight capacity of an opaque truck body as set forth in claim 1 wherein the step of sensing the presence of the material of a second density includes the steps of:
d. sensing the pressure of material against the inside wall of said truck body at discrete locations positioned along a horizontal line on said inside wall; and
e. remotely indicating, in response to a sensed increase in a pressure, that a full load of the second greater density material has been reached.

3. A method of preventing the overloading of the weight capacity of an opaque truck body as set forth in claim 1 wherein the step of sensing the presence of the material of a second density includes the step of:
f. removing at least one closure covering a viewing hole on the side wall of said truck body to expose said viewing hole for sensing the presence of the material of a second density at said predetermined level.

4. A method of minitoring the volume of material loaded into an opaque truck body to prevent overloading of the truck body weight capacity, said method comprising the steps of:
a. loading material of a known density into said truck body;
b. sensing along the side wall of said truck body at a plurality of discrete locations the horizontal distribution of the material held in said truck body said discrete locations defining a maximum loading level for said material beyond which level the weight capacity of the truck body would be exceeded;
c. indicating when the material is evenly distributed at said maximum loading level which is less than the full volume capacity of said truck body; and
d. stopping the loading of the material into said truck body.

5. A method of monitoring the volume of material loaded into an opaque truck body as set forth in claim 4 wherein the steps of sensing the volume of material and indicating when the volume of material has reached the weight capacity of the truck include the steps of:
e. sensing the level of material on the inside wall of the truck body; and
f. visually indicating on the outside wall of the truck body when the material being loaded has reached a predetermined level on the inside wall of the truck body.

6. A method of monitoring the volume of material loaded into an opaque truck body as set forth in claim 4 wherein the steps of sensing the volume of material and indicating when the volume of material has reached the weight capacity of the truck include the steps of:
e. sensing the level of material on the inside wall of the truck body; and
f. indicating at a location remote from said truck body when the material being loaded has reached a predetermined level on the inside wall of the truck body.

7. A method of monitoring the volume of material loaded into an opaque truck body as set forth in claim 4 wherein the steps of sensing the volume of material and indicating when the volume of material has reached the weight capacity of the truck include the steps of:
e. sensing the distribution of material held in said truck body at a plurality of discrete locations aligned along a horizontal line against the side wall of said truck body wherein said plurality of discrete locations defining a maximum load level of said material; and
f. remotely indicating the even horizontal distribution of material in said truck body in response to all of said plurality of discrete locations sensing material at said maximum load level.

* * * * *